(12) United States Patent
Trogdon et al.

(10) Patent No.: US 12,340,783 B1
(45) Date of Patent: Jun. 24, 2025

(54) MOBILE RECORDING STUDIO

(71) Applicants: Lawrence Trogdon, Baltimore, MD (US); Markia Cherry, Baltimore, MD (US)

(72) Inventors: Lawrence Trogdon, Baltimore, MD (US); Markia Cherry, Baltimore, MD (US)

( * ) Notice: Subject to any disclaimer, the term of this patent is extended or adjusted under 35 U.S.C. 154(b) by 350 days.

(21) Appl. No.: 17/967,951

(22) Filed: Oct. 18, 2022

(51) Int. Cl.
*G10K 11/16* (2006.01)
*G06Q 20/18* (2012.01)
*H04R 1/10* (2006.01)
*H04R 3/00* (2006.01)

(52) U.S. Cl.
CPC .............. *G10K 11/16* (2013.01); *G06Q 20/18* (2013.01); *H04R 1/10* (2013.01); *H04R 3/00* (2013.01)

(58) Field of Classification Search
None
See application file for complete search history.

(56) References Cited

U.S. PATENT DOCUMENTS

| | | | |
|---|---|---|---|
| 6,086,380 A * | 7/2000 | Chu | G07F 17/26 |
| 10,288,982 B2 | 5/2019 | O'Connell | |
| 2002/0181932 A1 | 12/2002 | Azous | |
| 2008/0198271 A1 | 8/2008 | Malki | |
| 2009/0118849 A1 * | 5/2009 | Dery | H04N 23/64 700/94 |
| 2010/0296801 A1 | 11/2010 | Lane | |
| 2011/0153045 A1 * | 6/2011 | Ryckman | H04N 1/00132 700/94 |
| 2012/0140098 A1 * | 6/2012 | Ryckman | G07F 17/3223 348/241 |
| 2012/0323716 A1 * | 12/2012 | Matthews | G06Q 30/02 705/26.1 |
| 2021/0012606 A1 * | 1/2021 | Barnum | F25D 31/005 |
| 2021/0087846 A1 * | 3/2021 | Wasserman | E04H 15/10 |

FOREIGN PATENT DOCUMENTS

WO 2008102353 8/2008

* cited by examiner

*Primary Examiner* — Kristy A Haupt
(74) *Attorney, Agent, or Firm* — Kyle A. Fletcher, Esq.

(57) ABSTRACT

The mobile recording studio comprises a booth, recording equipment, one or more microphones, one or more pairs of headphones, a plurality of speakers, a payment terminal, and a display. The booth may be a soundproof portable recording studio. The mobile recording studio may be adapted to accept a fee from an individual recording artist for a predetermined amount of recording time during which time the recording equipment may convert audio of one or more recording artists performing in front of the one or more microphones into a digital audio file. The mobile recording studio may be adapted to email the digital audio file to the individual recording artist at the end of the predetermined amount of recording time. The display may be adapted for the one or more recording artists to control a recording session.

19 Claims, 4 Drawing Sheets

MOBILE RECORDING STUDIO

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of audio recording and mobile studios, more specifically, a mobile recording studio.

Summary of Invention

The mobile recording studio comprises a booth, recording equipment, one or more microphones, one or more pairs of headphones, a plurality of speakers, a payment terminal, and a display. The booth may be a soundproof portable recording studio. The mobile recording studio may be adapted to accept a fee from an individual recording artist for a predetermined amount of recording time during which time the recording equipment may convert audio of one or more recording artists performing in front of the one or more microphones into a digital audio file. The mobile recording studio may be adapted to email the digital audio file to the individual recording artist at the end of the predetermined amount of recording time. The display may be adapted for the one or more recording artists to control a recording session.

An object of the invention is to provide a soundproof booth that may be moved to a venue and used as a recording studio.

Another object of the invention is to provide one or more microphones, one or more pairs of headphones, and a plurality of speakers that are adapted for recording, monitoring, and playing back a performance within the booth and to provide a payment terminal for accepting payment for the recording session and a touchscreen display to control the recording session.

A further object of the invention is to provide computer controller recording equipment that may digitize input from the one or more microphones to create an audio file and may convert the audio file back to audible signals that may be listened to using the headphones and/or speakers.

Yet another object of the invention is to email the audio file to the artist at the conclusion of the recording session.

These together with additional objects, features and advantages of the mobile recording studio will be readily apparent to those of ordinary skill in the art upon reading the following detailed description of the presently preferred, but nonetheless illustrative, embodiments when taken in conjunction with the accompanying drawings.

In this respect, before explaining the current embodiments of the mobile recording studio in detail, it is to be understood that the mobile recording studio is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mobile recording studio.

It is therefore important that the claims be regarded as including such equivalent construction insofar as they do not depart from the spirit and scope of the mobile recording studio. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
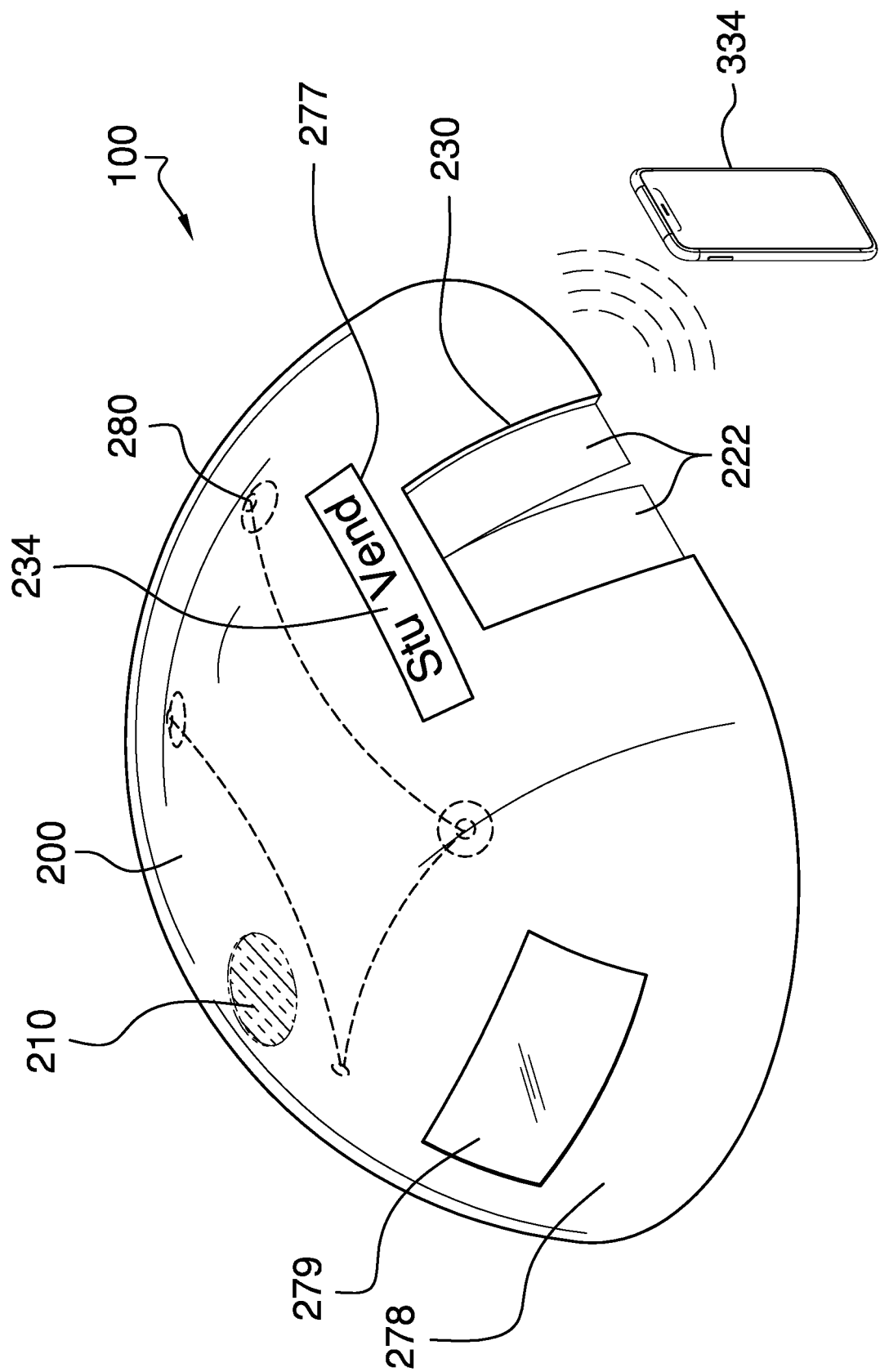
FIG. 1 is a perspective view of an embodiment of the disclosure.
Figure 2:
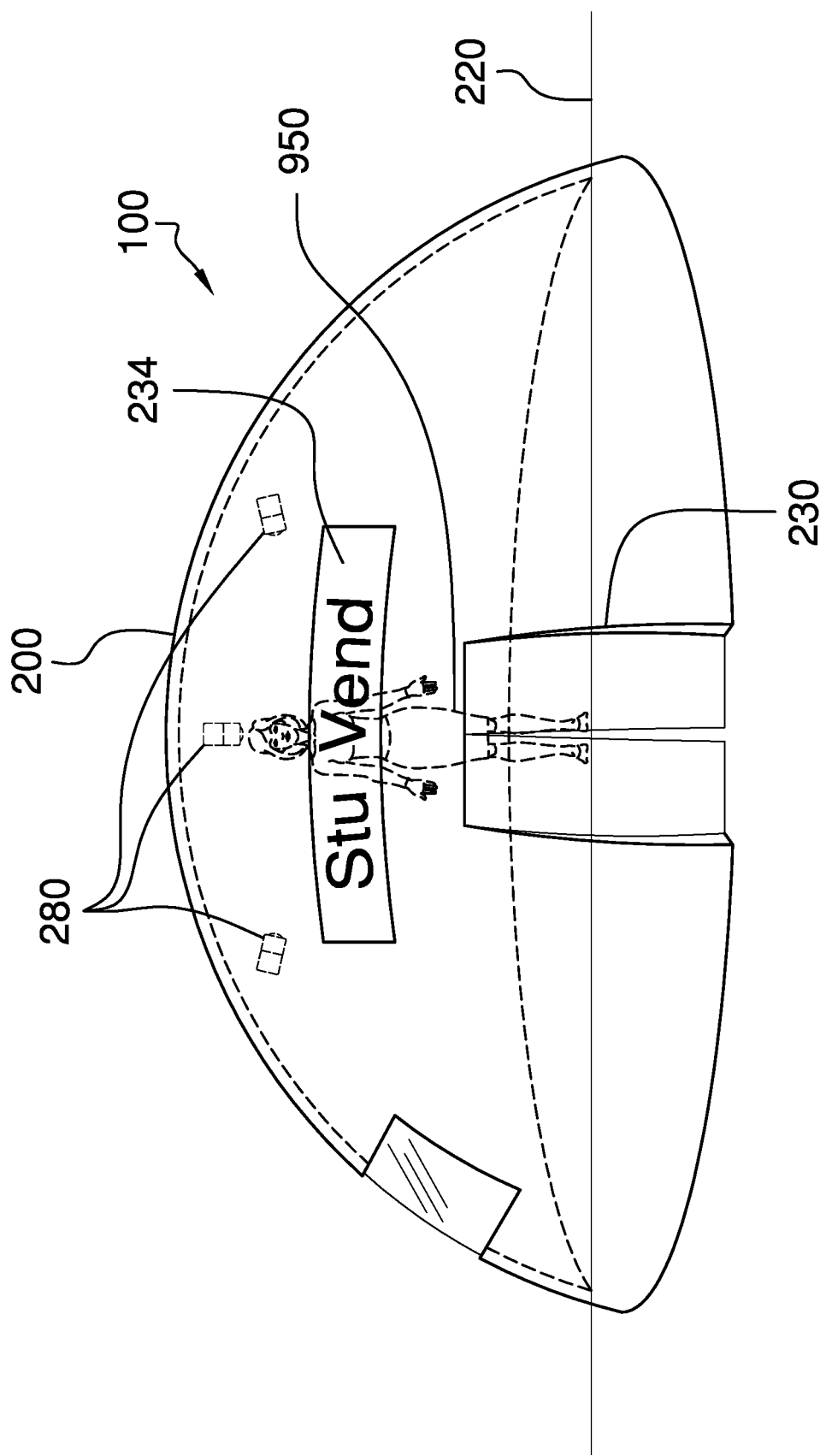
FIG. 2 is a front view of an embodiment of the disclosure.
Figure 3:
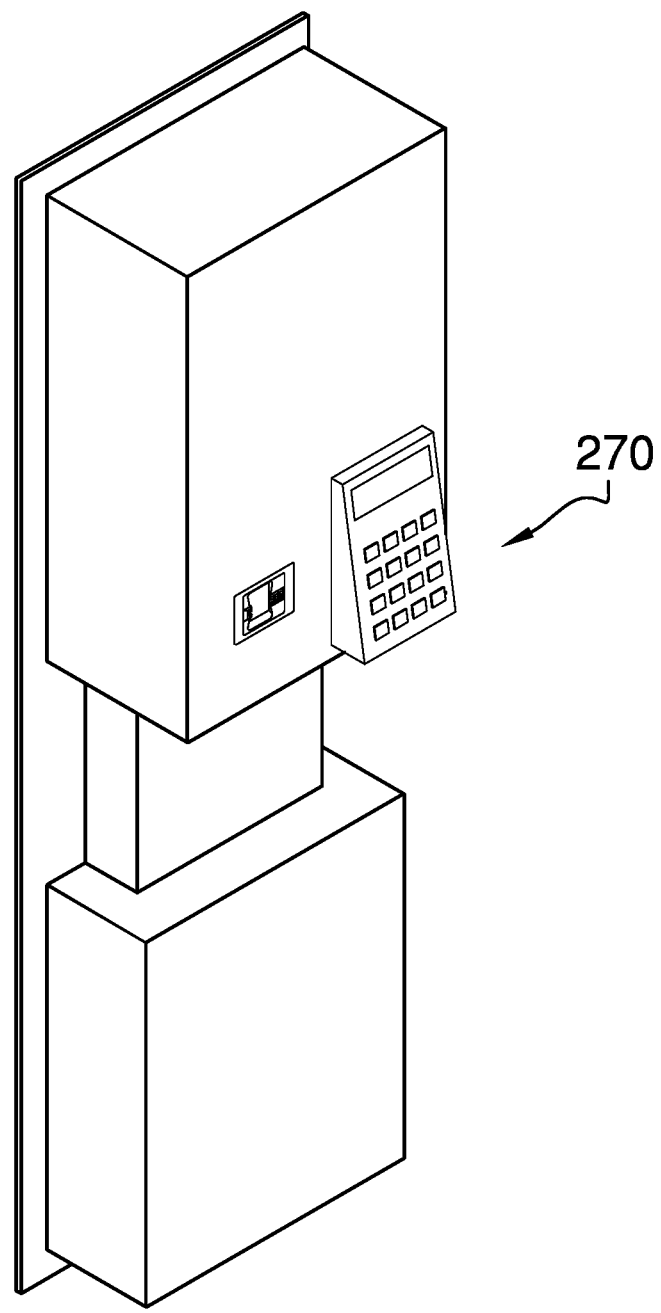
FIG. 3 is a perspective view of the payment terminal.
Figure 4:
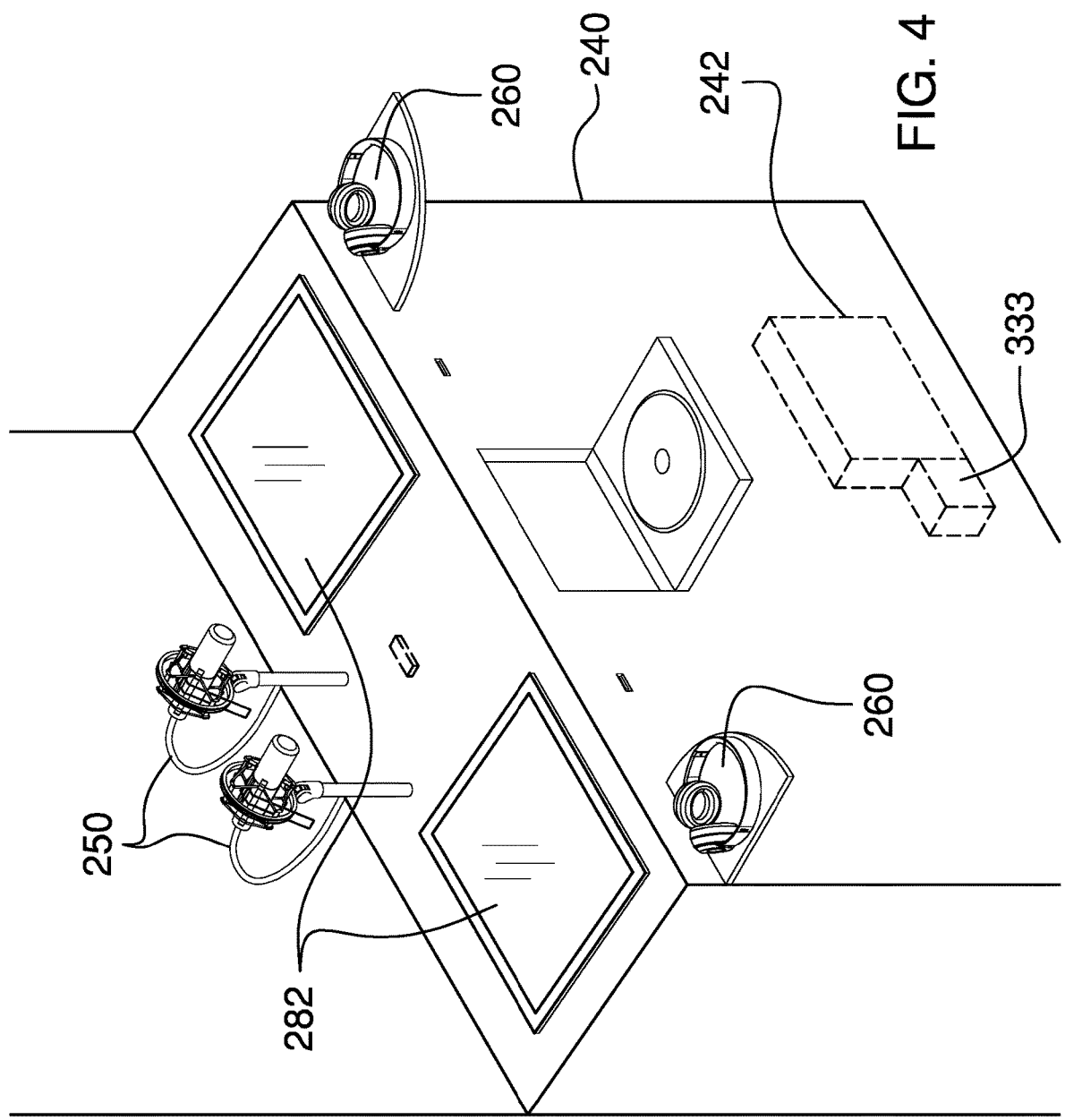
FIG. 4 is a perspective view of the recording equipment located within the booth.

Detailed reference will now be made to a first potential embodiment of the disclosure, which is illustrated in FIGS. 1 through 4.

The mobile recording studio 100 (hereinafter invention) comprises a booth 200, recording equipment 242, one or more microphones 250, one or more pairs of headphones 260, a plurality of speakers 280, a payment terminal 270, and a display 282. The booth 200 may be a soundproof portable recording studio. The invention 100 may be adapted to accept a fee from an individual recording artist for a predetermined amount of recording time during which time the recording equipment 242 May convert audio of one or more recording artists 950 performing in front of the one or more microphones 250 into a digital audio file. The invention 100 may be adapted to email the digital audio file to the individual recording artist at the end of the predetermined amount of recording time. The display 282 may be adapted for the one or more recording artists 950 to control a recording session.

The booth 200 may be in the shape of a dome, which is further defined with a floor 220. The booth 200 may comprise a front access aperture 230 adapted for the one or more recording artists 950 to enter the booth 200 and to egress from the booth 200. The front access aperture 230 may be covered by one or more doors 232. In some embodiments, the one or more doors 232 may be a glass doors that may be adapted for bystanders to observe the recording session in order to entice the bystanders to use the invention 100.

In some embodiments, the booth 200 may be mounted on a vehicle and driven to a venue.

The booth may comprise soundproofing material 210 to attenuate external sounds. As non-limiting examples, the soundproofing material 210 may comprise fiberglass, mineral wool, cork, polyurethane foam, or any combination thereof.

The one or more doors 232 may also be soundproof to attenuate the external sounds. As a non-limiting example, the one or more doors 232 may comprise a double panes to enhance soundproofing of the one or more doors 232.

A front 277 of the booth 200 may comprise a signboard 234 located above the one or more doors 232. As non-limiting examples, the signboard 234 may present a logo, directions for use, advertising, or any combination thereof.

An equipment panel 240 may be located within the booth 200. The equipment panel 240 may house the recording equipment 242, the one or more microphones 250, the one or more pairs of headphones 260, the plurality of speakers 280, the payment terminal 270, and the display 282.

The recording equipment 242 may comprise a computer controller, memory, an audio digitizing circuitry, an audio playback circuitry, one or more network interfaces, and one or more input/output interfaces. The recording equipment 242 May be operable to record audio present at the one or more microphones 250, to save the recorded audio as the digital audio file, to playback the digital audio file through the plurality of speakers 280, to process payment for the recording session, to email the digital audio file, to accept commands entered the display 282, and to present operational status on the display 282.

The recording equipment 242 includes a transceiver 333 that is able to wirelessly communicate with a smart phone 334 in order for the smart phone 334 to store a copy of the recording being created within the booth 200.

The computer controller may comprise a processor that is electrically coupled to the memory, the audio digitizing circuitry, the audio playback circuitry, the one or more network interfaces, and the one or more input/output interfaces. The computer controller may execute an application program that May be stored within the memory. The application program may contain instructions that control the sequence and timing of operations of the audio digitizing circuitry, the audio playback circuitry, the one or more network interfaces, and the one or more input/output interfaces.

The memory may comprise volatile and non-volatile random access memory, one or more disk drives, or any combination thereof. The one or more disk drives may comprise rotating media, solid state media, or both. The memory may be operable to store programs and data necessary for operation of the recording equipment 242.

The audio digitizing circuitry may convert digitizing circuit input signals into digital patterns that may be stored as the digital audio file. The digitizing circuit input signals may encode audio impinging upon the one or more microphones 250. The audio playback circuitry may convert the digital audio file into playback circuit output signals. The playback circuit output signals may be applied to the plurality of speakers 280 to reproduce the audio encoded by the playback circuit output signal.

The one or more network interfaces may be operable to communicate with external devices via one or more external networks. The one or more external networks may be wired, wireless, or both. As non-limiting examples, the one or more network interfaces may enable the recording equipment 242 to communicate with a bank server for the purpose of accepting payment and to an email server for the purpose of emailing the digital audio file.

The one or more input/output interfaces may electrically couple the computer controller to the payment terminal 270 and the display 282.

Alternatively, the smart phone 334 may also include the componentry of the recording equipment 242. This would mean that the smart phone 334 includes the computer controller, memory, audio digitizing circuitry, audio playback circuitry, one or more network interfaces, and one or more input/output interfaces. Moreover, the smart phone 334 would include these components in lieu of the recording equipment.

An exterior 278 of the booth 200 may include an auxiliary display 279. The auxiliary display 279 is wired to the equipment panel 240 and is able to display the recording that is occurring within the booth 200.

An individual microphone selected from the one or more microphones 250 may be a sound transducer that converts sound into a microphone output signal. The microphone output signal may be electrically routed to the audio digitizing circuitry. The one or more microphones 250 may be adapted to be hand held during use or may be placed into microphone holders 254 mounted on the equipment panel 240.

The one or more pairs of headphones 260 may be available on headphone holders 264 on the equipment panel 240. An individual pair of headphones may be adapted to play audio for the individual recording artist. The source of the audio played by the individual pair of headphones may be the audio playback circuitry which may route the playback circuit output signals to the plurality of speakers 280, the one or more pairs of headphones 260, or both. The recording equipment 242 may be adapted to play the audio picked up by the one or more microphones 250 so that the one or more recording artists 950 may monitor themselves. The recording equipment 242 may be adapted to play accompaniment through the one or more pairs of headphones 260, the plurality of speakers 280, or both.

The payment terminal 270 may be a device for accepting payment. The payment terminal 270 may comprise a card reader and a pin pad. The card reader may be operable to read card identification information from a payment card. The pin pad May be adapted to accept a PIN number from the individual recording artist.

The display 282 may be adapted to present information, menus, and other navigation information to the individual recording artist. The display 282 may comprise a touch screen 284 that may be adapted to accept input from the individual recording artist. The display 282 and the touch screen 284 may be adapted to control the operation of the invention 100 as directed by the individual recording artist.

In use, one or more recording artists 950 may enter the booth 200 and may make payment for a predetermined amount of recording time using the payment terminal 270. Using the display and the touch screen 284, the one or more recording artists may direct the recording equipment 242 to play accompaniment, if so desired, via the plurality of speakers 280 and/or the one or more pairs of headphones 260 and to record the recording session. The one or more recording artists 950 May direct the recording equipment 242 to begin recording and the one or more recording artists 950 may sing and/or play instruments into the one or more microphones 250. The one or more recording artists 950 may monitor their performance via the one or more pairs of headphones 260 if desired. After recording, the one or more recording artists 950 may direct the recording equipment 242 to play the recording back via the plurality of speakers 280. If dissatisfied, the recording may be erased and recorded again or another song may be recorded. The one or more recording artists 950 may record repeatedly until the predetermined amount of recording time expires. At the end of the recording session, the recording equipment 242 may email a digital audio file to the one or more recording artists 950. The digital audio file may contain the digital audio file.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, an "application" or "app" may be software that is designed to perform one or more specific tasks on a personal computing device, smart phone, or some other computing device.

As used in this disclosure, an "audio file" may be a digital representation of a sound that is used to store a recording of the sound. Hardware may be used to create the digital representation of the sound and to convert the digital representation of the sound back into an audible sound.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used herein, "encode" may refer to altering a signal, a message, or a dataset to embed information into the signal, the message, or the dataset. "Decode" may refer to extracting or recovering the information from the signal, the message, or the dataset. By way of example and not of limitation, the purpose of encoding and decoding may be to obfuscate the information during transmission or storage, to modulate a signal, to increase the efficiency of a communications or storage medium, or to convert one format into another format.

As used herein, the word "desired" may refer to a specific value or action within a range of supported values or action. A "desired" value or action may indicate that a range of values or actions is enabled by the invention and that a user of the invention may select a specific value or action within the supported range of values or actions based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, a "display" may be a surface upon which is presented an image, potentially including, but not limited to, graphic images and text, that is interpretable by an individual viewing the image. When used as a verb, "display" may be defined as presenting such an image.

As used herein, "external network" may refer to a communication link between two or more devices that is physically routed outside of a building or campus and May therefore be more considered less secure.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "microphone" may be a transducer that converts the energy from vibration into electrical energy. The sources of vibrations include, but are not limited to, acoustic energy.

As used in this disclosure, a "network" may refer to a data communication or data exchange structure where data is electronically transferred between nodes, also known as terminals, which are electrically attached to the network. In common usage, the operator of the network is often used as an adjective to describe the network. As a non-limiting example, a telecommunication network may refer to a network run by a telecommunication organization while a banking network may refer to a network operated by an organization involved in banking.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "rock wool" may refer to a fibrous material formed by spinning or drawing molten mineral of rock materials such as slag and ceramics. Rock wool may also be known as mineral wool. Applications of rock wool include thermal insulation, filtration, soundproofing, and hydroponic growth medium.

As used herein, "soundproofing" may refer to any means of reducing the sound pressure created by a specified sound source at a specified sound receptor. Soundproofing may entail the use of noise barriers to reflect and/or absorb sound energy, damping structures such as sound baffles, active noise cancellation circuits, or any combination thereof. An environment that utilizes such soundproofing techniques may be referred to as being "soundproof".

As used in this disclosure, a "speaker" may be an electrical transducer that converts an electrical signal into an audible sound; also known as a loudspeaker.

As used in this disclosure, a "touchscreen" may be an interface that allows a user to interface with a logical device by touching the image bearing surface of a display.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mobile recording studio comprising:
   a booth, recording equipment, one or more microphones, one or more pairs of headphones, a plurality of speakers, a payment terminal, and a display;
   wherein the booth is a soundproof portable recording studio;
   wherein the mobile recording studio is adapted to accept a fee from an individual recording artist for a predetermined amount of recording time during which time the recording equipment converts audio of one or more recording artists performing in front of the one or more microphones into a digital audio file;
   wherein the mobile recording studio is adapted to email the digital audio file to the individual recording artist at the end of the predetermined amount of recording time;
   wherein the display is adapted for the one or more recording artists to control a recording session;
   wherein the recording equipment comprises a computer controller, memory, an audio digitizing circuitry, an audio playback circuitry, one or more network interfaces, and one or more input/output interfaces;
   wherein the recording equipment is operable to record audio present at the one or more microphones, to save the recorded audio as the digital audio file, to playback the digital audio file through the plurality of speakers, to process payment for the recording session, to email the digital audio file, to accept commands entered the display, and to present operational status on the display.

2. The mobile recording studio according to claim 1
   wherein the booth comprises a floor, and a front access aperture adapted for the one or more recording artists to enter the booth and to egress from the booth;
   wherein the front access aperture is covered by one or more doors.

3. The mobile recording studio according to claim 2
   wherein the one or more doors are a glass doors that are adapted for bystanders to observe the recording session.

4. The mobile recording studio according to claim 2
   wherein the booth includes soundproofing material to attenuate external sounds.

5. The mobile recording studio according to claim 4
   wherein the one or more doors are soundproof to attenuate the external sounds.

6. The mobile recording studio according to claim 5
   wherein the one or more doors comprise double panes to enhance soundproofing of the one or more doors.

7. The mobile recording studio according to claim 6
   wherein a front of the booth comprises a signboard located above the one or more doors.

8. The mobile recording studio according to claim 7
   wherein the signboard present a logo, directions for use, advertising, or any combination thereof.

9. The mobile recording studio according to claim 7
   wherein an equipment panel is located within the booth;
   wherein the equipment panel houses the recording equipment, the one or more microphones, the one or more pairs of headphones, the plurality of speakers, the payment terminal, and the display.

10. The mobile recording studio according to claim 9
    wherein the computer controller comprises a processor that is electrically coupled to the memory, the audio digitizing circuitry, the audio playback circuitry, the one or more network interfaces, and the one or more input/output interfaces;
    wherein the computer controller executes an application program that is stored within the memory;
    wherein the application program contains instructions that control the sequence and timing of operations of the audio digitizing circuitry, the audio playback circuitry, the one or more network interfaces, and the one or more input/output interfaces.

11. The mobile recording studio according to claim 10
    wherein the memory comprises volatile and non-volatile random access memory, one or more disk drives, or any combination thereof;
    wherein the one or more disk drives comprise rotating media, solid state media, or both;
    wherein the memory is operable to store programs and data necessary for operation of the recording equipment.

12. The mobile recording studio according to claim 11
    wherein the audio digitizing circuitry converts digitizing circuit input signals into digital patterns that are stored as the digital audio file;
    wherein the digitizing circuit input signals encode audio impinging upon the one or more microphones;
    wherein the audio playback circuitry converts the digital audio file into playback circuit output signals;
    wherein the playback circuit output signals are applied to the plurality of speakers to reproduce the audio encoded by the playback circuit output signal.

13. The mobile recording studio according to claim 12
    wherein the one or more network interfaces are operable to communicate with external devices via one or more external networks;
    wherein the one or more external networks are wired, wireless, or both.

14. The mobile recording studio according to claim 13 wherein the one or more input/output interfaces electrically couple the computer controller to the payment terminal and the display.

15. The mobile recording studio according to claim 14 wherein an exterior of the booth includes an auxiliary display that displays the audio recording being created in the booth, which enables persons outside of the booth to view.

16. The mobile recording studio according to claim 15
    wherein the one or more pairs of headphones are available on headphone holders on the equipment panel;
    wherein an individual pair of headphones is adapted to play audio for the individual recording artist;
    wherein the source of the audio played by the individual pair of headphones is the audio playback circuitry which routes the playback circuit output signals to the plurality of speakers, the one or more pairs of headphones, or both;
    wherein the recording equipment is adapted to play the audio picked up by the one or more microphones so that the one or more recording artists monitors themselves;

wherein the recording equipment is adapted to play accompaniment through the one or more pairs of headphones, the plurality of speakers, or both.

17. The mobile recording studio according to claim 16 wherein the display is adapted to present information, menus, and other navigation information to the individual recording artist;

wherein the display comprises a touch screen that is adapted to accept input from the individual recording artist;

wherein the display and the touch screen are adapted to control the operation of the mobile recording studio as directed by the individual recording artist.

18. The mobile recording studio according to claim 14 wherein an individual microphone selected from the one or more microphones is a sound transducer that converts sound into a microphone output signal;

wherein the microphone output signal is electrically routed to the audio digitizing circuitry;

wherein the one or more microphones are adapted to be hand held during use or are placed into microphone holders mounted on the equipment panel.

19. The mobile recording studio according to claim 18 wherein the payment terminal is a device for accepting payment;

wherein the payment terminal comprises a card reader and a pin pad;

wherein the card reader is operable to read card identification information from a payment card;

wherein the pin pad is adapted to accept a PIN number from the individual recording artist.

* * * * *